(12) United States Patent
Aoki et al.

(10) Patent No.: US 9,249,871 B2
(45) Date of Patent: Feb. 2, 2016

(54) LOCK-UP DEVICE FOR TORQUE CONVERTER

(75) Inventors: Tatsuyuki Aoki, Ibaraki (JP); Kozo Yamamoto, Neyagawa (JP); Ken Mototsune, Hirakata (JP); Yoshihiro Matsuoka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/111,113

(22) PCT Filed: Apr. 17, 2012

(86) PCT No.: PCT/JP2012/060339
§ 371 (c)(1),
(2), (4) Date: Oct. 10, 2013

(87) PCT Pub. No.: WO2012/153608
PCT Pub. Date: Nov. 15, 2012

(65) Prior Publication Data
US 2014/0034436 A1 Feb. 6, 2014

(30) Foreign Application Priority Data

May 12, 2011 (JP) ................................. 2011-106779

(51) Int. Cl.
*F16H 45/02* (2006.01)

(52) U.S. Cl.
CPC .......... *F16H 45/02* (2013.01); *F16H 2045/021* (2013.01); *F16H 2045/0284* (2013.01); *F16H 2045/0294* (2013.01)

(58) Field of Classification Search
CPC .......... F16D 25/044; F16H 2045/0205; F16H 2045/2073

USPC ............................ 192/3.29, 3.3, 85.37, 89.23
See application file for complete search history.

(56) References Cited

U.S. PATENT DOCUMENTS

| | | | | |
|---|---|---|---|---|
| 4,926,988 A | * | 5/1990 | Kundermann | 192/3.3 |
| 5,992,589 A | * | 11/1999 | Fukushima | 192/3.29 |
| 2004/0251104 A1 | | 12/2004 | Abe et al. | |
| 2006/0207853 A1 | * | 9/2006 | Ackermann et al. | 192/3.29 |
| 2008/0078638 A1 | * | 4/2008 | Degler et al. | 192/3.3 |
| 2009/0127049 A1 | * | 5/2009 | Krause et al. | 192/3.29 |
| 2009/0127050 A1 | * | 5/2009 | Ari et al. | 192/3.29 |

FOREIGN PATENT DOCUMENTS

| | | |
|---|---|---|
| JP | 2001-280444 A | 10/2001 |
| JP | 2004-278717 A | 10/2004 |
| JP | 2011-073483 A | 4/2011 |
| JP | 2011-231857 A | 11/2011 |

* cited by examiner

*Primary Examiner* — Rodney H Bonck
*Assistant Examiner* — Lillian Nguyen
(74) *Attorney, Agent, or Firm* — Global IP Counselors, LLP

(57) ABSTRACT

A lock-up device is a device disposed in a space produced between a front cover and a turbine in a torque converter so as to mechanically connect the front cover and the turbine, and includes a clutch part and a release part. The clutch part is disposed in a power transmission path from the front cover to the turbine, and is configured to be in a clutch-on state of transmitting a power from the front cover to the turbine in a set posture. The release part is configured to be actuated by means of a hydraulic pressure, turn the clutch part of the clutch-on state into a clutch-off state, and block transmission of the power from the front cover to the turbine.

4 Claims, 4 Drawing Sheets

LOCK-UP DEVICE FOR TORQUE CONVERTER

CROSS-REFERENCE TO THE RELATED APPLICATIONS

This U.S. national phase application claims priority to Japanese Patent Application No. 2011-106779 filed on May 12, 2011. The entire disclosure of Japanese Patent Application No. 2011-106779 is hereby incorporated herein by reference

TECHNICAL FIELD

The present invention relates to a lock-up device, particularly to a lock-up device that is disposed in a space produced between a front cover and a turbine in a torque converter so as to mechanically connect the front cover and the turbine.

BACKGROUND ART

In many cases, a torque converter is provided with a lock-up device for directly transmitting torque from a front cover to a turbine. As described in PTL 1 and so forth, the lock-up device includes: a piston that can be frictionally coupled to the front cover; a drive plate fixed to the piston; a plurality of torsion springs supported by the drive plate; and an output plate elastically coupled to the piston through the plural torsion springs in a rotational direction. The output plate is fixed to the turbine.

The piston axially divides the space between the front cover and the turbine, and is axially movable by difference in hydraulic pressure between the axially divided spaces. Further, when a lock-up clutch is turned on (power is transmitted), the hydraulic pressure is controlled such that the hydraulic pressure on the turbine side of the piston can be greater than that on the front-cover side of the piston. Accordingly, the piston is moved towards the front cover, and a friction facing mounted to the outer peripheral part of the piston is pressed onto the friction surface of the front cover. Therefore, the torque from the engine is directly transmitted from the front cover to a turbine-side member.

CITATION LIST

Patent Literature

PTL 1: Japan Laid-open Patent Application Publication No. JP-A-2010-031951

SUMMARY

Technical Problems

In the well-known lock-up device described in PTL 1 and so forth, the lock-up clutch is being turned off in a normal state set for a vehicle, i.e., a state that the hydraulic pressure and so forth are not acting on the lock-up device. When the lock-up clutch is then turned on, the hydraulic pressure is controlled such that the back pressure (the hydraulic pressure on the turbine side) of the piston can be greater. Therefore, while the lock-up clutch is being turned on, the load of the hydraulic pump is increased for increasing the hydraulic pressure.

Incidentally, the lock-up clutch has been recently designed to be turned on in a quite low engine speed region in order to save fuel consumption. Therefore, during travelling of a vehicle, the state that the lock-up clutch is being turned on often has a longer period of time than the state that the lock-up clutch is being turned off. Accordingly, the period of time that a high load acts on the hydraulic pump is prolonged, and this hinders saving of fuel consumption.

It is an advantage of the present invention to reduce a load and so forth acting on a hydraulic pump while a lock-up clutch is being turned on, and thereby, to enable progress in saving of fuel consumption.

Solution to Problems

A lock-up device for a torque converter according to a first invention is a device disposed in a space produced between a front cover and a turbine in the torque converter so as to mechanically connect the front cover and the turbine, and includes a clutch part and a release part. The clutch part is disposed in a power transmission path from the front cover to the turbine, and is configured to be in a clutch-on state of transmitting a power from the front cover to the turbine in a set posture. The release part is configured to be actuated by a hydraulic pressure, turn the clutch part of the clutch-on state into a clutch-off state, and block transmission of the power from the front cover to the turbine.

In the present device, the lock-up clutch is configured to be turned on in a normal state that the device takes a set posture, i.e., a state that the hydraulic pressure is not acting on the lock-up device. Further, in turning off the lock-up clutch, the release part is actuated by the hydraulic pressure, and the clutch part is turned into a clutch-off state.

Here, the load of the hydraulic pump can be reduced and saving of fuel consumption can be progressed in such a vehicle that the lock-up clutch is configured to be turned on in a quite low engine speed region, i.e., a vehicle that the lock-up on-time thereof is longer than the lock-up off-time thereof.

A lock-up device for a torque converter according to a second invention relates to the lock-up device of the first invention, and wherein the clutch part includes: an input-side member that is coupled to the front cover while being non-rotatable relatively thereto; an output-side member that is coupled to the turbine while being non-rotatable relatively thereto; a friction member that is mounted to either of the input-side member and the output-side member; and a pressing member for pressing the friction member between and in contact with the input-side member and the output-side member. Further, the release part includes a piston configured to be actuated by the hydraulic pressure so as to release pressing by the pressing member.

Here, the friction member is pressed between and in contact with the input-side member and the output-side member by the pressing member, and thereby, torque is transmitted from the input-side member to the output-side member. Further, the release part is actuated by the hydraulic pressure, and thereby, pressing of the pressing member is released. Accordingly, the lock-up clutch is turned off.

A lock-up device for a torque converter according to a third invention relates to the lock-up device of the second invention, and wherein the input-side member includes first and second annular plates that are coupled to the front cover while being non-rotatable relatively thereto and that at least either thereof is coupled to the front cover while being axially movable. The output-side member includes an output plate that has an outer peripheral part disposed between the first and second annular plates, has the friction members fixed to portions of the outer peripheral part thereof in opposition to the both annular plates, and is axially movable. Further, the pressing member is configured to press the axially movable one of the both annular plates towards the other of the both annular plates.

Here, the rotation of the front cover is transmitted to the both annular plates. Further, torque is transmitted to the output plate disposed between the both annular plates through the friction members.

A lock-up device for a torque converter according to a fourth invention relates to the lock-up device of the third invention, and wherein the piston is axially movable and is configured to move the axially movable annular plate away from the other annular plate against a pressing force of the pressing member by the hydraulic pressure.

Here, in turning off the lock-up clutch, the piston is actuated by the hydraulic pressure, and thereby, one of the annular plates is separated away from the other of the annular plates. Accordingly, transmission of torque is blocked from the pair of the annular plates to the output plate.

A lock-up device for a torque converter according to a fifth invention relates to the lock-up device of the third or fourth invention, and further includes a damper mechanism disposed between the output plate and the turbine.

DETAILED DESCRIPTION OF THE PREFERRED EMBODIMENTS

—First Exemplary Embodiment—

Figure 1:
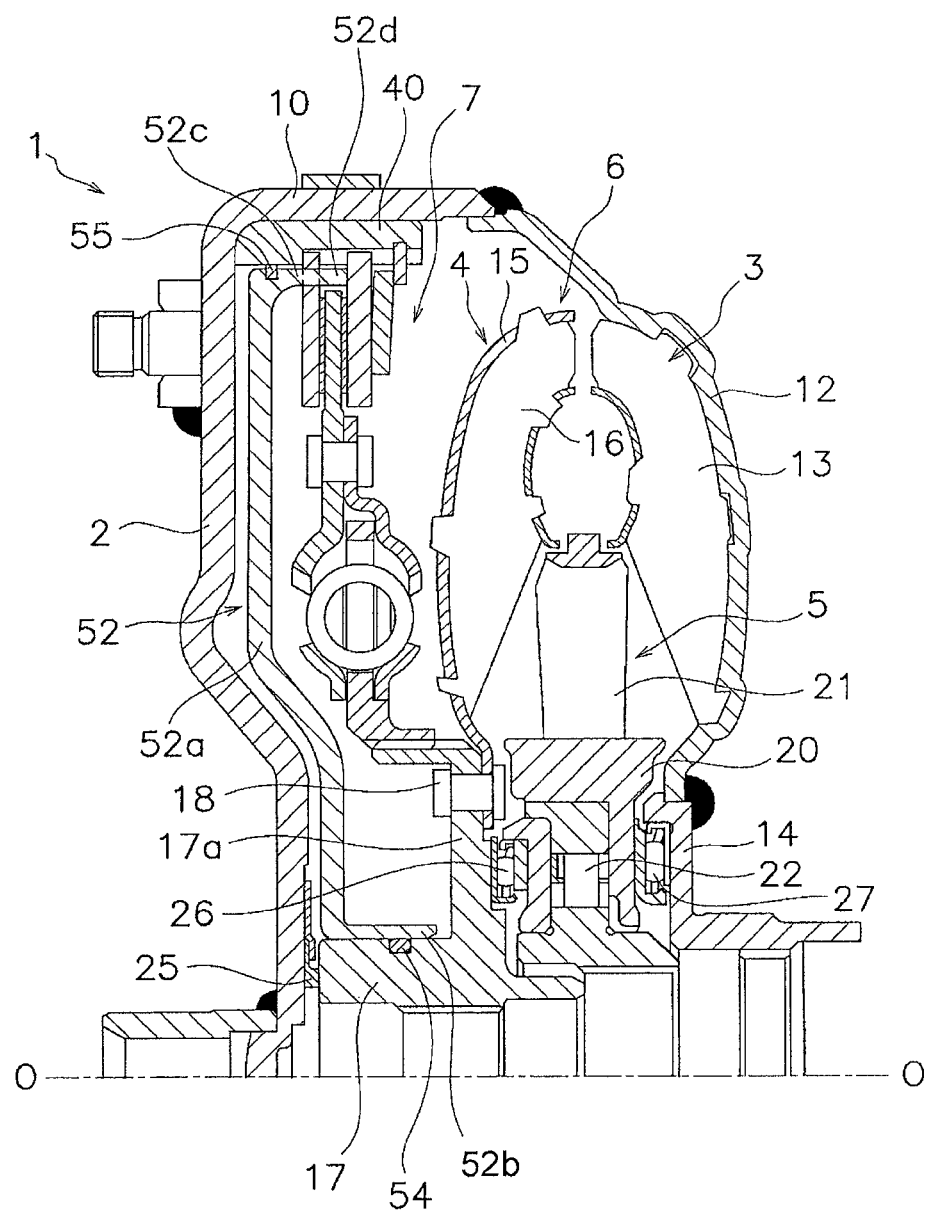
FIG. 1 is a partial cross-sectional view of a torque converter equipped with a lock-up device according to a first exemplary embodiment of the present invention.

FIG. 1 is a partial cross-sectional view of a torque converter 1 employing a lock-up device as a first exemplary embodiment of the present invention. In FIG. 1, an engine (not illustrated in the figure) is disposed on the left side, whereas a transmission (not illustrated in the figure) is disposed on the right side. A line O-O depicted in FIG. 1 indicates a rotary axis of the torque converter and the lock-up device.

Entire Structure of Torque Converter

The torque converter 1 is a device for transmitting torque from an engine-side crankshaft (not illustrated in the figures) to an input shaft of the transmission. The torque converter 1 includes: a front cover 2 fixed to an input-side member; a torque converter main body 6 composed of three types of vane wheels (an impeller 3, a turbine 4 and a stator 5); and a lock-up device 7.

The front cover 2 is a disc-shaped member, and an outer peripheral tubular portion 10 is formed on the outer peripheral part of the front cover 2 while being protruding axially towards the transmission. The impeller 3 includes: an impeller shell 12 fixed to the outer peripheral tubular portion 10 of the front cover 2 by welding; a plurality of impeller blades 13 fixed to the inside of the impeller shell 12; and a tubular impeller hub 14 fixed to the inner peripheral side of the impeller shell 12 by welding. The turbine 4 is disposed in opposition to the impeller 3 within a fluid chamber. The turbine 4 includes: a turbine shell 15; a plurality of turbine blades 16 fixed to the turbine shell 15; and a turbine hub 17 fixed to the inner peripheral side of the turbine shell 15. The turbine hub 17 has a flange 17a extending to the outer peripheral side, and the inner peripheral part of the turbine shell 15 is fixed to the flange 17a by a plurality of rivets 18. Further, the input shaft of the transmission (not illustrated in the figures) is spline-coupled to the inner peripheral part of the turbine hub 17.

The stator 5 is a mechanism disposed between the inner peripheral part of the impeller 3 and that of the turbine 4, and serves to regulate the flow of an operating oil returning to the impeller 3 from the turbine 4. The stator 5 mainly includes: a disc-shaped stator carrier 20; and a plurality of stator blades 21 disposed on the outer peripheral surface of the stator carrier 20. The stator carrier 20 is supported by a stationary shaft (not illustrated in the figures) through a one-way clutch 22. It should be noted that a thrust washer 25 is mounted axially between the front cover 2 and the turbine hub 17, whereas thrust bearings 26 and 27 are respectively mounted between the turbine hub 17 and the stator carrier 20 and between the stator carrier 20 and the impeller hub 14.

Lock-up Device

Figure 2:
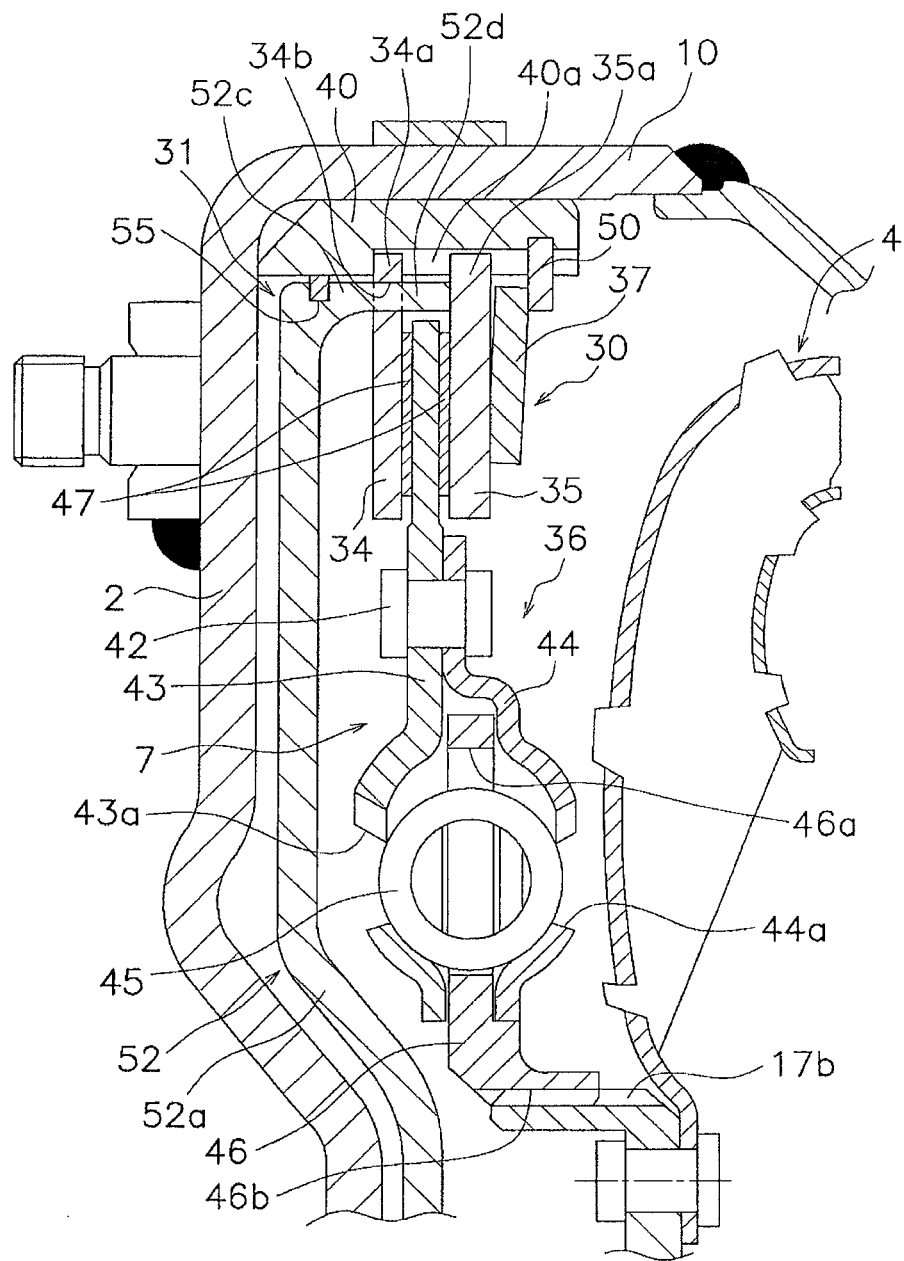
FIG. 2 is a partial enlarged view of the lock-up device.

The lock-up device 7 is disposed in an annular space produced between the front cover 2 and the turbine 4. FIG. 2 illustrates the lock-up device 7 extracted from the entirety. The lock-up device 7 includes a clutch part 30 and a release part 31. The clutch part 30 is disposed in a power transmission path from the front cover 2 to the turbine 4. Further, when in a set position, the clutch part 30 is configured to be in a clutch-on state of transmitting the torque from the front cover 2 to the turbine 4. The release part 31 is configured to be actuated by hydraulic pressure, turn the clutch part 30 of the clutch-on state into a clutch-off state, and block transmission of torque from the front cover 2 to the turbine 4.

Clutch Part

The clutch part 30 includes first and second clutch plates (input-side member) 34 and 35 annularly shaped, a damper mechanism (output-side member) 36 and a disc spring 37.

The first and second clutch plates 34 and 35 are attached to a collar 40 fixed to the front cover 2. Specifically, the collar 40 is fixed to the outer peripheral tubular portion 10 of the front cover 2 by welding or the like, and has a plurality of grooves 40a formed on a part of the inner peripheral surface thereof. Further, the both clutch plates 34 and 35 have a plurality of teeth 34a and a plurality of teeth 35a, which are meshed with the plural grooves 40a, on the outer peripheral parts thereof. With such structure, the both clutch plates 34 and 35 are axially movable with respect to and non-rotatable relatively to the collar 40 (the front cover 2). It should be noted that a plurality of openings 34b are formed in and axially penetrate through the first clutch plate 34 that is the front-cover-2-side one of the first and second clutch plates 34 and 35. Further, the first clutch plate 34 may be fixed immovably in the axial direction.

The damper mechanism 36 includes: first and second output plates 43 and 44 that the outer peripheral parts thereof are fixed to each other by rivets 42; a plurality of torsion springs 45 supported by window holes 43a and 44a formed in the both output plates 43 and 44; and an output flange 46.

The first output plate 43, disposed on the front-cover-2 side, has an outer diameter greater than that of the second output plate 44, and the outer peripheral part of the first output plate 43 is extending between the first and second clutch plates 34 and 35. Further, annular friction members 47 are fixed to the both surfaces of the outer peripheral part of the first output plate 43.

The output flange 46 has a plurality of window holes 46a. The torsion springs 45 are accommodated in the window holes 46a. Further, the output flange 46 has a spline hole 46b formed in the inner peripheral part thereof. Furthermore, the spline hole 46b is meshed with a spline shaft 17b formed on the outer periphery of the flange 17a of the turbine hub 17 while being movable in the axial direction.

The disc spring 37 is disposed on the further turbine side than the both clutch plates 34 and 35, while being disposed between the second clutch plate 35, which is the turbine-side clutch plate, and a snap ring 50. The snap ring 50 is attached to the collar 40. Further, the disc spring 37 is set in an elastically deformed state. Therefore, in a normal state (a free state) that the operating oil is not acting on the lock-up device, the outer peripheral part of the first output plate 43 to which the friction members 47 are fixed is pressed between and in contact with the two clutch plates 34 and 35. Thus, the clutch-on state is produced.

Release Part

As illustrated in FIG. 1, the release part 31 includes a piston 52 disposed between the front cover 2 and the clutch part 30. The piston 52 has: a disc-shaped plate portion 52a; an inner peripheral tubular portion 52b formed in the inner peripheral part of the plate portion 52a; and an outer peripheral tubular portion 52c formed in the outer peripheral part of the plate portion 52a. The respective tubular portions 52b and 52c are extending towards the turbine from the plate portion 52a. The inner peripheral tubular portion 52b of the piston 52 is supported by the outer peripheral surface of the turbine hub 17 while being movable in the axial direction. Further, a seal member 54 is mounted to the outer peripheral surface of the turbine hub 17. The seal member 54 seals between the inner peripheral tubular portion 52b and the outer peripheral surface of the turbine hub 17. Further, a seal member 55 is mounted to the outer peripheral tubular portion 52c of the piston 52. The seal member 55 seals between the outer peripheral tubular portion 52c and the collar 40. A plurality of release protrusions 52d are formed on the outer peripheral tubular portion 52c of the piston 52. The plural release protrusions 52d are formed at predetermined intervals in the circumferential direction, while being extending from the outer peripheral tubular portion 52c to the further turbine side. Further, the release protrusions 52d pass through the openings 34b of the first clutch plate 34, and the tip ends thereof make contact with the front-cover-side lateral surface of the second clutch plate 35.

Actions

Next, actions will be explained. As described above, in the lock-up device, the lock-up clutch is herein set in the on-state while the hydraulic pressure is not acting on the release part 31. Specifically, while the operating oil is not acting on the piston 52, the first output plate 43 to which the friction members 47 are fixed is interposed and held between the first clutch plate 34 and the second clutch plate 35 by the disc spring 37.

Under such condition, when the engine speed is low and the vehicle speed is low in starting moving a vehicle, the operating oil is supplied to the space produced between the piston 52 and the front cover 2 through a control valve (not illustrated in the figures), and thereby, the hydraulic pressure in the space is increased. Accordingly, the piston 52 is moved towards the turbine. Therefore, the release protrusions 52d of the piston 52 press the disc spring 37 towards the turbine through the second clutch plate 35. Accordingly, the two clutch plates 34 and 35 are released from interposing and holding the friction members 47 therebetween, and the lock-up clutch is turned into an off-state. While the lock-up clutch is in the off-state, the torque inputted into the front cover 2 is inputted into the torque converter main body 6, and is transmitted to the transmission through the operating oil.

When the speed ratio of the torque converter 1 is increased and the rotation speed of the input shaft of the transmission reaches a predetermined speed, the operating oil is drained from the space produced between the piston 52 and the front cover 2 through the control valve (not illustrated in the figures). Accordingly, the pressing force of the piston 52 towards the turbine is also released. Therefore, the first output plate 43 to which the friction members 47 are fixed is supposed to be interposed and held between the two clutch plates 34 and 35 by the pressing force of the disc spring 37. Accordingly, the lock-up clutch is turned into the on-state.

Incidentally, the lock-up on-time is longer than the lock-up off-time in a recent vehicle that the lock-up clutch is configured to be turned on in a quite low engine speed region. By contrast, in the present exemplary embodiment, the operating oil is configured to be drained in the lock-up on-state. Therefore, the load of the hydraulic pump is reduced. As a result, saving of fuel consumption can be achieved.

—Second Exemplary Embodiment—

Figure 3:
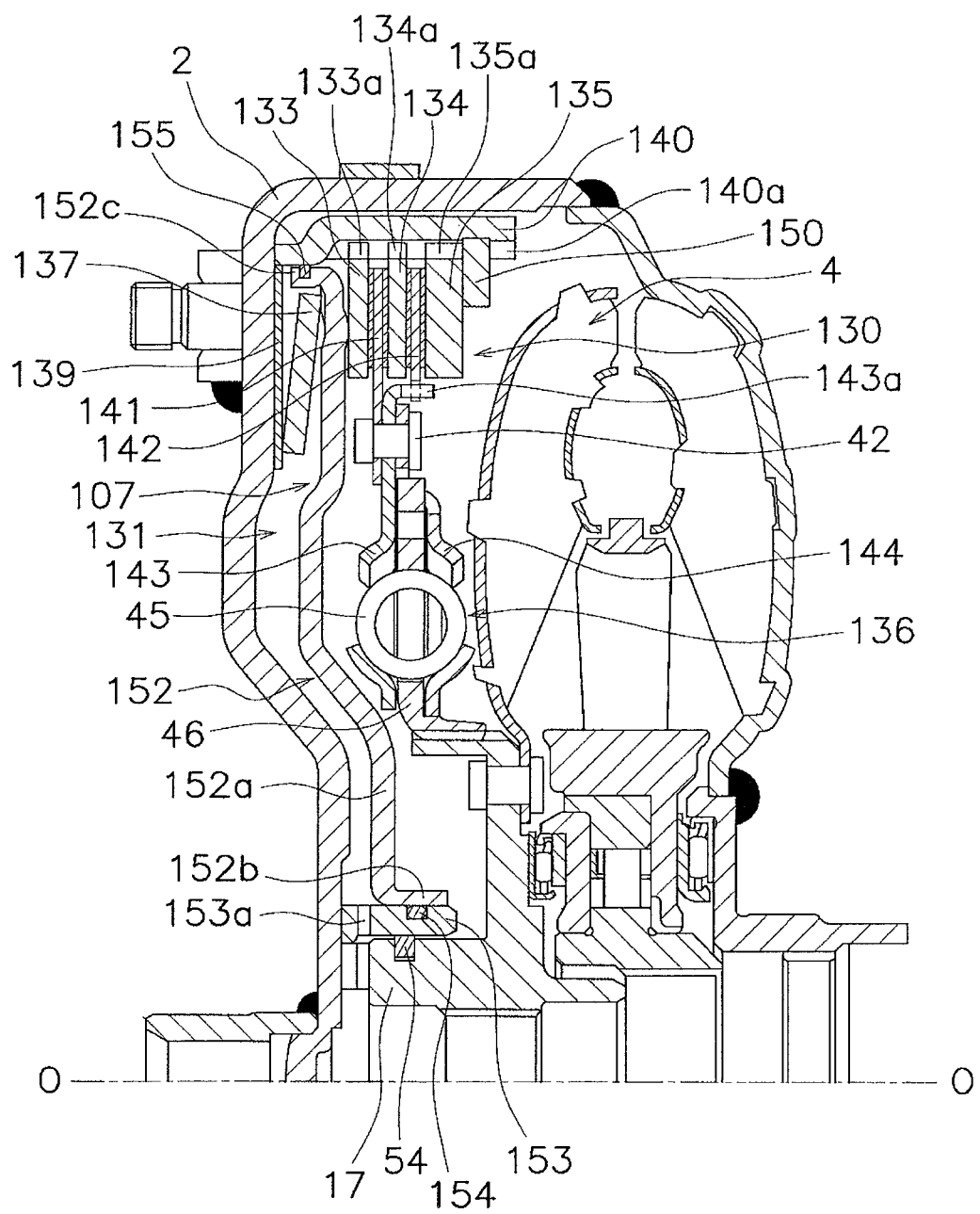
FIG. 3 is a partial cross-sectional view of a torque converter equipped with a lock-up device according to a second exemplary embodiment of the present invention.

FIG. 3 illustrates a lock-up device according to a second exemplary embodiment of the present invention. The structures other than the lock-up device are similar to those in the first exemplary embodiment. Therefore, the explanation thereof will not be hereinafter made. Further, the same reference signs are assigned to component members similar to those in the first exemplary embodiment.

Lock-up Device

Similarly to the first exemplary embodiment, a lock-up device 107 includes a clutch part 130 and a release part 131. Similarly to the first exemplary embodiment, when in the set position, the clutch part 130 is configured to be in the clutch-on state of transmitting torque from the front cover 2 to the turbine 4. Further, the release part 131 is configured to be actuated by hydraulic pressure, turn the clutch part 130 of the clutch-on state into the clutch-off state, and block transmission of torque from the front cover 2 to the turbine 4.

Clutch Part

The clutch part 130 includes first to third clutch plates 133, 134 and 135 annularly formed, a damper mechanism 136 and a disc spring 137.

The first and second clutch plates 133 and 134 have the same shape, whereas the third clutch plate 135 is different from the first and second clutch plates 133 and 134 only in the thickness. The respective clutch plates 133 to 135 are attached to a collar 140 fixed to the front cover 2. A plurality of grooves 140a are formed on a part of the inner peripheral surface of the collar 140, whereas a plurality of teeth 133a, a plurality of teeth 134a and a plurality of teeth 135a, which are meshed with the plural grooves 140a, are formed on the respective outer peripheral parts of the clutch plates 133 to 135. With such structure, the respective clutch plates 133 to 135 are axially movable with respect to and non-rotatable relatively to the front cover 2 fixed to the collar 140.

The damper mechanism 136 includes: first and second output-side clutch plates 141 and 142; first and second output plates 143 and 144; the plural torsion springs 45 supported by the both output plates 143 and 144; and the output flange 46. The torsion springs 45 and the output flange 46 have the same structures as those in the first exemplary embodiment.

Each of the first and second output-side clutch plates 141 and 142 is formed in a disc shape, and has annular friction members fixed to the both surfaces of the outer peripheral part thereof. The both plates 141 and 142 are respectively disposed while being sandwiched among the three clutch plates 133 to 135. The first output-side clutch plate 141, which is the output-side clutch plate disposed on the front-cover-2 side, is fixed to the front-cover-2-side surface of the first output plate 143 together with the two output plates 143 and 144 by the rivets 42.

The first output plate 143 is formed in a tubular shape by bending the outer peripheral end portion thereof towards the turbine 4. A plurality of grooves are axially formed on a tubular portion 143a of the first output plate 143, while being aligned at predetermined intervals in the circumferential direction. A plurality of teeth are formed on the inner peripheral end portion of the second output-side clutch plate 142, and are meshed with the plural grooves formed on the tubular portion 143a. With such structure, the second output-side clutch plate 142 is non-rotatable and axially movable with respect to the first output plate 143. It should be noted that the first output-side clutch plate 141 is axially movable together with other members composing the damper mechanism 136.

The disc spring 137 is disposed between the front cover 2 and a piston (to be described) of the release part 131. It should be noted that an annular protection plate 139 is disposed on a part of the front cover 2, i.e., a part with which the disc spring 137 makes contact. The disc spring 137 presses the respective clutch plates 133 to 135, 141 and 142 towards the turbine 4 through the piston, and the pressing force is received by a snap ring 150 attached to the collar 140. Further, the disc spring 137 is set in an elastically deformed state. Therefore, in the normal state (the free state) that the operating oil is not acting on the lock-up device, the output-side clutch plates 141 and 142, to which the friction members are attached, are interposed and held among the three clutch plates 133 to 135. Thus, the clutch-on state is produced.

Release Part

As illustrated in FIG. 3, the release part 131 includes a piston 152 disposed between the front cover 2 and the clutch part 130. The piston 152 has: a disc-shaped plate portion 152a; an inner peripheral tubular portion 152b formed in the inner peripheral part of the plate portion 152a; and an outer peripheral tubular portion 152c formed in the outer peripheral part of the plate portion 152a.

The inner peripheral tubular portion 152b is extending towards the turbine 4 from the plate portion 152a, whereas the outer peripheral tubular portion 152c is extending towards the front cover 2 from the plate portion 152a. The inner peripheral tubular portion 152b is supported by a guide part 153 fixed to the front cover 2 on the outer peripheral side of the turbine hub 17, while being movable in the axial direction. The guide part 153 is formed in a tubular shape, and an oil hole 153a is radially bored through a part of the guide part 153.

It should be noted that the seal member 54 is mounted to the outer peripheral surface of the turbine hub 17. The seal member 54 seals between the outer peripheral surface of the turbine hub 17 and the inner peripheral surface of the guide part 153. Further, a seal member 154 is mounted to the outer peripheral surface of the guide part 153. The seal member 154 seals between the inner peripheral tubular portion 152b and the outer peripheral surface of the guide part 153. Yet further, a seal member 155 is mounted to the outer peripheral tubular portion 152c of the piston 152. The seal member 155 seals between the outer peripheral tubular portion 152c and the inner peripheral surface of the collar 140.

Actions

Next, actions will be explained. Similarly to the first exemplary embodiment, in the present lock-up device, the output-side clutch plates 141 and 142 and the clutch plates 133 to 135 are pressed in contact with each other by the disc spring 137 in the state that the hydraulic oil is not acting on the release part 131. Thus, the clutch-on state is produced.

Under such condition, when the engine speed is low and the vehicle speed is low in starting moving a vehicle, the pressure on the torque-converter-main-body-6 side of the piston 152 is controlled to be higher than the pressure on the front-cover-2 side of the piston 152 by the control valve (not illustrated in the figures). The piston 152 is thereby moved towards the front cover 2 against the urging force of the disc spring 137. Accordingly, the press-contact force acting among the clutch plates 133 to 135 and the output-side clutch plates 141 and 142 is released, and the lock-up clutch is turned into the off-state. While the lock-up clutch is in the off-state, the torque inputted into the front cover 2 is inputted into the torque converter main body 6, and is transmitted towards the transmission through the operating oil.

When the speed ratio of the torque converter 1 is increased and the rotation speed of the input shaft of the transmission reaches a predetermined speed, the hydraulic pressure on the front-cover-2 side of the piston 152 and the hydraulic pressure on the turbine-4 side of the piston 152 are controlled to be equal to each other by the control valve (not illustrated in the figures). Accordingly, the pressing force of the piston 152 towards the front cover 2 by hydraulic pressure is released, and the clutch plates 133 to 135 and the output-side clutch plates 141 and 142 are pressed in contact with each other by the pressing force of the disc spring 137. The lock-up clutch is thereby turned into the on-state.

In addition to advantageous effects similar to those achieved by the first exemplary embodiment, the present second exemplary embodiment is advantageous in that the hydraulic pressure for moving the piston 152 in turning off the lock-up clutch is only required to be greater than the urging force of the disc spring 137. In other words, the operating pressure of the piston 152 can be further reduced, and the load of the hydraulic pump can be further reduced.

—Third Exemplary Embodiment—

Figure 4:
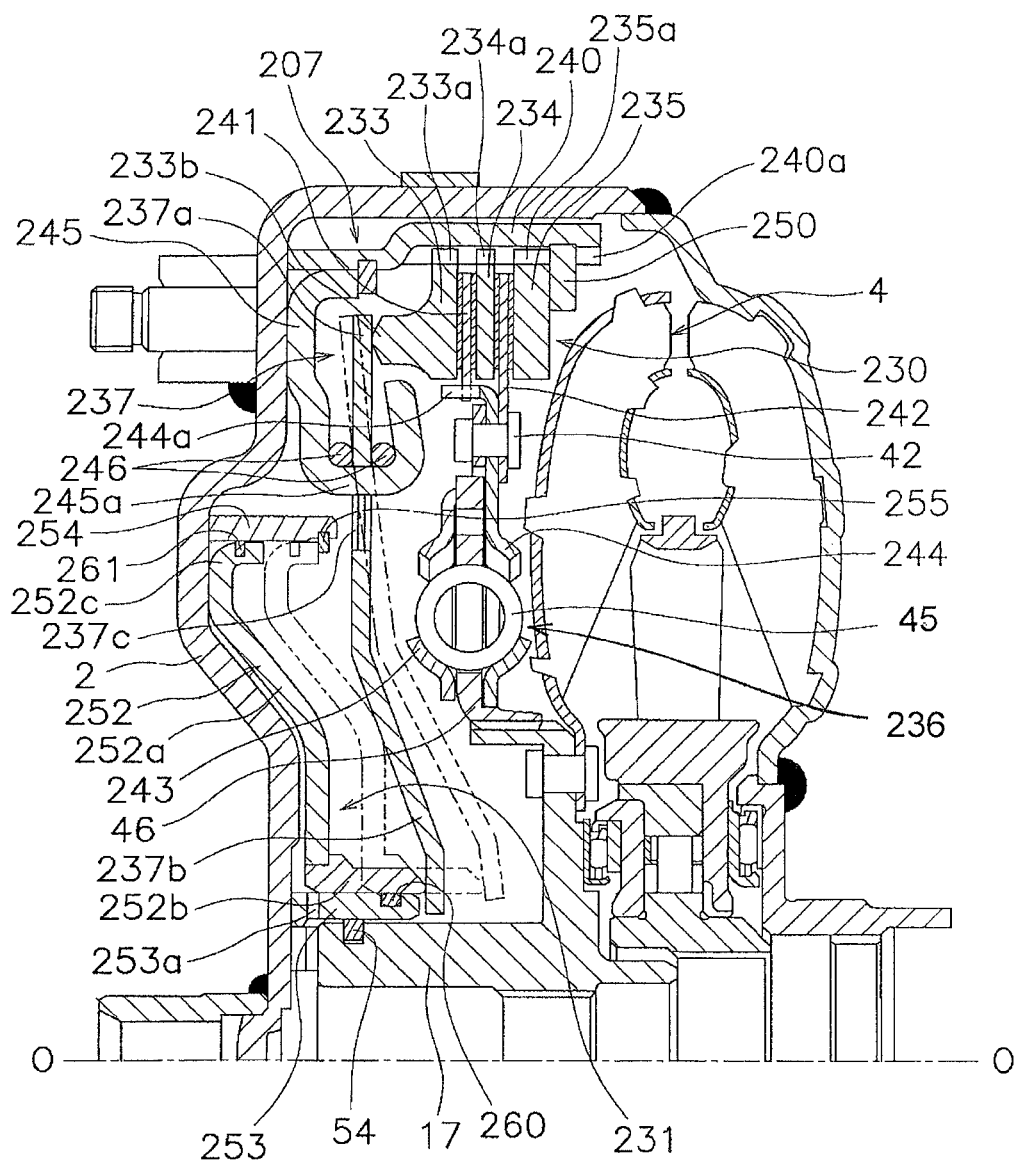
FIG. 4 is a partial cross-sectional view of a torque converter equipped with a lock-up device according to a third exemplary embodiment of the present invention.

FIG. 4 illustrates a lock-up device according to a third exemplary embodiment of the present invention. The structures other than the lock-up device are similar to those in the first exemplary embodiment. Therefore, the explanation thereof will not be hereinafter made. Further, the same reference signs are assigned to component members similar to those in the first exemplary embodiment.

Lock-up Device

Similarly to the respective exemplary embodiments, a lock-up device 207 includes a clutch part 230 and a release part 231. When in the set position, the clutch part 230 is configured to be in the clutch-on state of transmitting torque from the front cover 2 to the turbine 4. Further, the release part 231 is configured to be actuated by hydraulic pressure, turn the clutch part 230 of the clutch-on state into the clutch-off state, and block transmission of torque from the front cover 2 to the turbine 4.

Clutch Part

The clutch part 230 includes first to third clutch plates 233, 234 and 235 annularly formed, a damper mechanism 236 and a diaphragm spring 237.

The first to third clutch plates 233 to 235 are fixed to a collar 240 fixed to the front cover 2. A plurality of grooves 240a are formed on a part of the inner peripheral surface of the collar 240, whereas a plurality of teeth 233a, a plurality of teeth 234a and a plurality of teeth 235a are respectively formed on the outer peripheral parts of the clutch plates 233 to 235 so as to be meshed with the plural grooves 240a. With such structure, the respective clutch plates 233 to 235 are axially movable with respect to and non-rotatable relatively to the front cover 2 fixed to the collar 240.

The damper mechanism 236 includes first and second output-side clutch plates 241 and 242, first and second output plates 243 and 244, the plural torsion springs 45 supported by the both output plates 243 and 244, and the output flange 46. The structures of the torsion springs 45 and the output flange 46 are similar to those in the first exemplary embodiment.

Each of the first and second output-side clutch plates 241 and 242 is formed in a disc shape, and has annular friction members fixed to the both surfaces of the outer peripheral part thereof. The both plates 241 and 242 are disposed while being respectively sandwiched among three clutch plates 233 to 235. The second output-side clutch plate 242, which is the clutch plate disposed on the turbine-4 side, is fixed to the turbine-4-side surface of the second output plate 244 together with the two output plates 243 and 244 by the rivets 42.

The outer peripheral end portion of the second output plate 244 is bent towards the front cover 2, and is formed in a tubular shape. A plurality of grooves are formed on the tubular portion 244a of the second output plate 244, while being extending in the axial direction and being aligned at predetermined intervals in the circumferential direction. A plurality of teeth are formed on the inner peripheral end portion of the first output-side clutch plate 241, and are meshed with the plural grooves formed on the tubular portion 244a. With such structure, the first output-side clutch plate 241 is non-rotatable and axially movable with respect to the second output plate 244. It should be noted that the second output-side clutch plate 242 is axially movable together with the other members composing the damper mechanism 236.

The diaphragm spring 237 is disposed between the front cover 2 and the first clutch plate 233. The diaphragm spring 237 has: a ring-shaped pressing portion 237a formed on the outer peripheral side; and a plurality of lever portions 237b extending from the pressing portion 237a to the inner peripheral side. Further, a plurality of opening portions 237c are formed between the pressing portion 237a and the plural lever portions 237b. The pressing portion 237a is disposed for pressing a protrusion 233b formed on the front-cover-2 side of the first clutch plate 233.

A support member 245 is mounted on the inner peripheral side of the collar 240, while being mounted between the front cover 2 and the pressing portion 237a of the diaphragm spring 237. The support member 245 is formed in an annular shape, and has a plurality of support protrusions 245a formed on the inner peripheral end portion thereof. The plural support protrusions 245a are respectively bent towards the turbine 4 while passing through the opening portions 237c of the diaphragm spring 237, and further, are bent at the tip ends thereof to the outer peripheral side. The diaphragm spring 237 is supported by the support protrusions 245a through two wire rings 246.

With such structure, the diaphragm spring 237 is configured to press the first clutch plate 233 towards the turbine 4, and the pressing force is received by a snap ring 250 attached to the collar 240. Further, the diaphragm spring 237 is set in an elastically deformed state. Therefore, in the normal state (the free state) that the operating oil is not acting on the lock-up device, the output-side clutch plates 241 and 242, to which the friction members are fixed, are interposed and held among the three clutch plates 233 to 235. Thus, the clutch-on state is produced.

Release Part

As illustrated in FIG. 4, the release part 231 includes a piston 252 disposed between the front cover 2 and the lever portions 237b of the diaphragm spring 237. The piston 252 has: a disc-shaped plate portion 252a; an inner peripheral tubular portion 252b formed in the inner peripheral part of the plate portion 252a; and an outer peripheral tubular portion 252c formed in the outer peripheral part of the plate portion 252a. The inner peripheral tubular portion 252b and the outer peripheral tubular portion 252c are extending towards the turbine 4 from the plate portion 252a. Further, the tip end of the inner peripheral tubular portion 252b makes contact with the inner peripheral ends of the lever portions of the diaphragm spring 237.

The inner peripheral tubular portion 252b is supported by an inner peripheral guide part 253 fixed to the front cover 2 on the outer peripheral side of the turbine hub 17, while being movable in the axial direction. The inner peripheral guide part 253 is formed in a cylindrical shape, and has an oil hole 253a radially bored through a part thereof.

Further, the outer peripheral tubular portion 252c is supported by an outer peripheral guide part 254, while being movable in the axial direction. The outer peripheral guide part 254 is formed in a cylindrical shape, and is fixed to a radially intermediate part of the front cover 2 on the outer peripheral side of the turbine hub 17. A snap ring 255 is mounted to the turbine-4-side end portion on the inner peripheral surface of the outer peripheral guide part 254 in order to restrict moving of the piston 252.

It should be noted that the seal member 54 is mounted to the outer peripheral surface of the turbine hub 17, and seals between the outer peripheral surface of the turbine hub 17 and the inner peripheral surface of the inner peripheral guide part 253. Further, a seal member 260 is mounted to the outer peripheral surface of the inner peripheral guide part 253, and seals between the inner peripheral tubular portion 252b and the outer peripheral surface of the inner peripheral guide part 253. Further, a seal member 261 is mounted to the outer peripheral tubular portion 252c of the piston 252, and seals between the outer peripheral tubular portion 252c and the inner peripheral surface of the outer peripheral guide part 254.

Actions

Next, actions will be explained. Similarly to the first and second exemplary embodiments, in the present lock-up device, the output-side clutch plates 241 and 242 and the clutch plates 233 to 235 are pressed in contact with each other by the diaphragm spring 237 in the state that the hydraulic pressure is not acting on the release part 231. Thus, the clutch-on state is produced.

Under such condition, when the engine speed is low and the vehicle speed is low in starting moving a vehicle, the operating oil is supplied to the space produced between the piston 252 and the front cover 2 by the control valve (not illustrated in the figures). The piston 252 is thereby moved towards the turbine 4, and presses the lever portions 237b of the diaphragm spring 237 towards the turbine 4. Accordingly, the force amplified with the lever ratio of the diaphragm spring 237 acts on the pressing portion 237a, and the pressing portion 237a is separated away from the first clutch plate 233. Therefore, the press-contact force among the clutch plates 233 to 235 and the output-side clutch plates 241 and 242 is released, and the lock-up clutch is turned into the off-state. While the lock-up clutch is in the off-state, the torque inputted into the front cover 2 is inputted into the torque converter main body 6, and is transmitted towards the transmission through the operating oil.

When the speed ratio of the torque converter 1 is increased and the rotation speed of the input shaft of the transmission reaches a predetermined speed, the operating oil is drained from the space produced between the piston 252 and the front cover 2 by the control valve (not illustrated in the figures). Accordingly, the piston 252 is pushed back towards the front cover 2 by the diaphragm spring 237. Accordingly, the pressing force of the diaphragm spring 237 acts on the clutch plates 233 to 235 and the output-side clutch plates 241 and 242, and these plates are pressed in contact with each other. The lock-up clutch is thereby turned into the on-state.

In the present third exemplary embodiment, the clutch part 230 is pressed with use of the diaphragm spring 237. Therefore, the hydraulic pressure for turning off the lock-up clutch can be reduced by the amount of the lever ratio of the diaphragm spring 237. In other words, the operating pressure of the piston 252 can be further reduced, and the load of the hydraulic pump can be further reduced.

Other Exemplary Embodiments

The present invention is not limited to the exemplary embodiments as described above, and a variety of changes or modifications can be made without departing from the scope of the present invention. The gist of the present invention is to turn on the lock-up clutch in the normal state that the operating oil is not acting. The structure of the clutch part and that of the release part are not limited to those described in the aforementioned exemplary embodiments.

Industrial Applicability

According to the lock-up device of the present invention, the load of a hydraulic pump can be reduced during travelling of a vehicle, and thereby, saving of fuel consumption can be implemented.

Advantageous Effects of Invention

According to the present invention as described above, a load acting on a hydraulic pump can be reduced during travelling of a vehicle, and accordingly, saving of fuel consumption can be implemented.

The invention claimed is:

1. A lock-up device for a torque converter, the lock-up device being disposed in a space between a front cover and a turbine in the torque converter to mechanically connect the front cover and the turbine, the lock-up device comprising:
   a clutch part disposed in a power transmission path from the front cover to the turbine, the clutch part being configured to be in a clutch-on state of transmitting a power from the front cover to the turbine in a set posture; and
   a release part configured to be actuated by a hydraulic pressure being increased in a space between the front cover and the piston to turn the clutch part of the clutch-on state into a clutch-off state and to block transmission of the power from the front cover to the turbine,
   the clutch part including
      an input-side member coupled to the front cover while being non-rotatable relative thereto,
      an output-side member coupled to the turbine while being non-rotatable relative thereto,
      a friction member mounted to either the input-side member or the output-side member, and
      a pressing member configured to press the friction member between the input-side member and the output-side member without the hydraulic pressure being applied to the pressing member, and
   the release part including a piston configured to release pressing of the pressing member when the hydraulic pressure is applied to the piston.

2. The lock-up device for a torque converter recited in claim 1, wherein
   the input-side member includes first and second annular plates,
   the first and second annular plates are coupled to the front cover while being non-rotatable relatively thereto,
   at least either of the first and second annular plates is coupled to the front cover while being axially movable,
   the output-side member includes an output plate having an outer peripheral part disposed between the first and second annular plates,
   the output plate includes the friction members fixed to portions of the outer peripheral part thereof in opposition to the both annular plates,
   the output plate is axially movable, and
   the pressing member is configured to press the one of the annular plates towards the other of the annular plates.

3. The lock-up device for a torque converter recited in claim 2, wherein
   the piston is axially movable and is configured to move the one of the annular plates away from the other of the annular plate in a direction opposite to a direction of a pressing force of the pressing member by the hydraulic pressure.

4. The lock-up device for a torque converter recited in claim 2, further comprising
   a damper mechanism being disposed between the output plate and the turbine.

* * * * *